United States Patent [19]

Daniel et al.

[11] 4,377,847

[45] Mar. 22, 1983

[54] MICROPROCESSOR CONTROLLED MICRO-STEPPING CHART DRIVE

[75] Inventors: Richard A. Daniel, Lakewood; Ronald J. Geil, Vermilion, both of Ohio

[73] Assignee: Gould Inc., Rolling Meadows, Ill.

[21] Appl. No.: 234,975

[22] Filed: Feb. 17, 1981

[51] Int. Cl.³ .................. G06F 15/46; G05B 19/40
[52] U.S. Cl. .......................... 364/400; 318/685; 318/696; 364/130; 364/174
[58] Field of Search .............. 364/130, 167, 174, 183, 364/400; 318/685, 696, 138, 601, 603

[56] References Cited

U.S. PATENT DOCUMENTS

| | | | |
|---|---|---|---|
| 3,492,553 | 1/1970 | Gordon et al. | 318/138 |
| 3,579,279 | 5/1971 | Kawasaki-shi | 318/696 |
| 3,582,751 | 6/1971 | Rosshirt et al. | 318/696 |
| 3,648,144 | 3/1972 | Rosen | 318/696 |
| 3,777,246 | 12/1973 | Barnes | 318/696 |
| 3,818,261 | 6/1974 | Clarke, Jr. | 318/696 |
| 3,878,445 | 4/1975 | Kirkham et al. | 318/308 |
| 3,885,210 | 5/1975 | Burnett | 318/696 |
| 3,899,729 | 8/1975 | Emery | 318/696 |
| 3,906,324 | 9/1975 | Smith | 318/567 |
| 3,908,195 | 9/1975 | Leenhouts | 441/1 |
| 3,909,693 | 9/1975 | Yoshitake et al. | 318/696 |
| 3,919,608 | 11/1975 | Usami et al. | 318/138 |
| 3,963,971 | 6/1976 | Leenhouts et al. | 318/696 |
| 3,971,972 | 7/1976 | Stich | 318/227 |
| 3,978,383 | 8/1976 | Carthy | 318/227 |
| 4,032,827 | 6/1977 | Dobratz et al. | 318/696 |
| 4,059,746 | 11/1977 | Haga | 364/107 |
| 4,075,544 | 2/1978 | Leenhouts | 318/696 |
| 4,087,732 | 5/1978 | Pritchard | 318/696 |
| 4,091,316 | 5/1978 | Friedman | 318/696 |
| 4,099,107 | 7/1978 | Eder | 318/227 |
| 4,107,594 | 8/1978 | Jacobs | 318/685 |
| 4,121,145 | 10/1978 | Talmadge | 318/696 |
| 4,126,821 | 11/1978 | Cannon | 318/696 |
| 4,140,956 | 2/1979 | Pritchard | 318/696 |
| 4,145,644 | 3/1979 | Liu | 318/696 |

OTHER PUBLICATIONS

"Microstepping of Step Motors" by The Superior Electric Company.

Primary Examiner—Joseph F. Ruggiero
Attorney, Agent, or Firm—John R. Garrett

[57] ABSTRACT

A microprocessor controlled micro-stepping chart drive circuit is disclosed. The invention comprises a step clock system, a micro-processor controller and a motor drive circuit. A speed selector establishes a numerical constant within the controller. This numerical constant is decremented down with each pulse of the step clock. When the counter reaches zero, the motor drive circuit is updated. Therefore, the time between updates of the motor drive circuit is a function of the value of the numerical constant.

4 Claims, 4 Drawing Figures

FULL STEPPING

MICROSTEPPING

NORMALIZED PHASE CURRENT-MICROSTEPPING

MICROPROCESSOR CONTROLLED MICRO-STEPPING CHART DRIVE

BACKGROUND OF THE INVENTION

The present invention relates to chart drives for oscillographic recorders and is particularly directed to a micro-stepping motor control circuit.

Driving the chart in an oscillographic recorder requires precision control of the driving motor. The prior art has taught two basic methods of driving the chart in the oscillographic recorder. The first and most prevalent consists of a synchronous A.C. motor, a mechanical transmission with gear ratios selected by soleniods. The second method is to use a D.C. servo system with a D.C. motor is combination with a tachometer.

The synchronous A.C. motor system requires a transmission consisting of precision gears and clutches. This type of system is difficult to assemble and is quite noisy in operation. Also the speed of the chart paper is not adjustable. It depends on the frequency of the A.C. line, and the build up of all the mechanical tolerances in the system. As parts wear, the chart speeds will tend to get farther and farther away from their nominal values. Also with a synchronous A.C. motor system, it is difficult to provide non-standard chart speeds since this would require a design for a new transmission. A separate transmission would be needed for 60Hz and 50Hz line frequencies.

In the D.C. servo system, difficulties arise in low speed operations since the voltages generated by the tachometer are very small. A good deal of calibration is required in this type of system. D.C. motors of sufficient torque to drive a chart in an oscillographic recorder that are small in physical size are quite expensive.

OBJECTS OF THE INVENTION

An object of the invention is to provide a chart drive system for use in oscillographic recorders that is an order of magnitude quieter in operation than a motor/-transmission system.

Another object of the invention is to provide a motor control system that gives extremely tiny increments of motion without gears or multiple pulleys while still retaining high speed capabilities.

Still another object of the present invention is to provide a chart drive system that has a continuously adjustable variable speed control to vary chart speed over a two and one half to one range.

Another object of the present invention is to provide an apparatus to control chart speeds in an oscillographic recorder that is independent of the power frequency.

The above objects are given by way of example. Thus, other desirable objectives and advantages achieved by the invention may occur to those skilled in the art. The scope of the invention is to be limited only by the appended claims.

BRIEF SUMMARY OF THE INVENTION

The above objects and other advantages are achieved by the present invention. An apparatus is provided for controlling the chart drive in an oscillographic recorder. The present invention contemplates that the chart drive of the oscillographic recorder uses a stepping motor in the micro-stepping mode. Micro-stepping is well known in the literature and will not be discussed in depth. One method to accomplish micro-stepping is by driving the four poles of a stepper motor through a linear power amplifier with a quadrature sine wave. In this mode, each one quarter cycle of the sine corresponds to one full step of the motor. Another method to accomplish micro-stepping contemplated by the present invention is to provide full wave rectified sine and cosine signals with a steering circuit to direct which coils will be powered. If the sine/cosine signals in either method are generated digitally, then each micro-step will be x/N degrees where x is the normal step angle and N is the number of increments per quarter cycle. The present invention contemplates a 1.8 degree per step stepping motor with 16 increments per quarter cycle thus yielding an increment of approximately 0.11 degrees per micro-step.

The invention comprises of a step clock system, a controller, a speed selector, a motion detector and a motor drive circuit. The controller preferably consists of a microprocessor and all associated support circuits. A microprocessor controls the drive of the oscillographic recorder. It does this by generating a numerical constant Y which is determined by the speed selector and in turn controls the period of time between successive pulses driving the stepper motor. The greater the number Y the longer period of time between successive pulses driving the stepper motor, and in turn the slower the rate at which the stepper motor drives the oscillographic recorder. A step clock input to the microprocessor is monitored by the microprocessor. For each step clock input, the number Y is decremented by one. When the number Y reaches zero, a pulse is generated which drives the stepper motor. If the number Y is not equal to zero, the frequency of the voltage control oscillator is measured with respect to a reference value. If the frequency is not in adjustment relative to the reference value, then the frequency of the voltage controlled oscillator is adjusted accordingly. If the frequency is proper with respect to the reference value, the system awaits for another clock input. The procedure is then repeated.

DESCRIPTION OF THE PREFERRED EMBODIMENT

Figure 1:
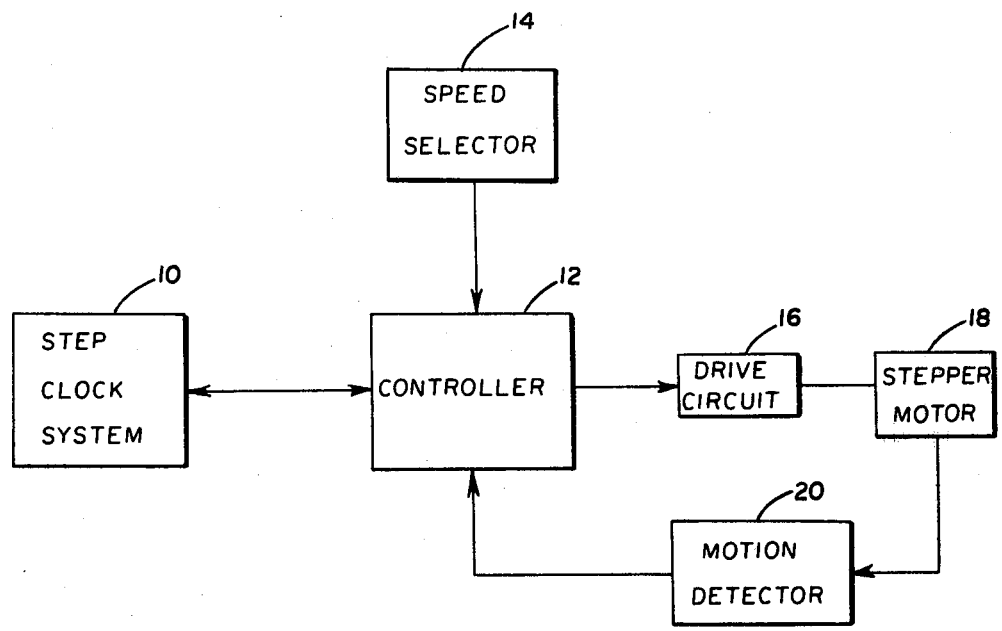
FIG. 1 shows a simplified block diagram of the present invention.

A description of the invention follows, referring to the drawings in which like reference numerals denote like elements of structure in each of the several Figures.

Referring now to FIG. 1, the present invention comprises a step clock system 10, a controller 12, a speed selector 14, a drive circuit 16, a stepper motor 18 and a motion detector 20.

Figure 2:
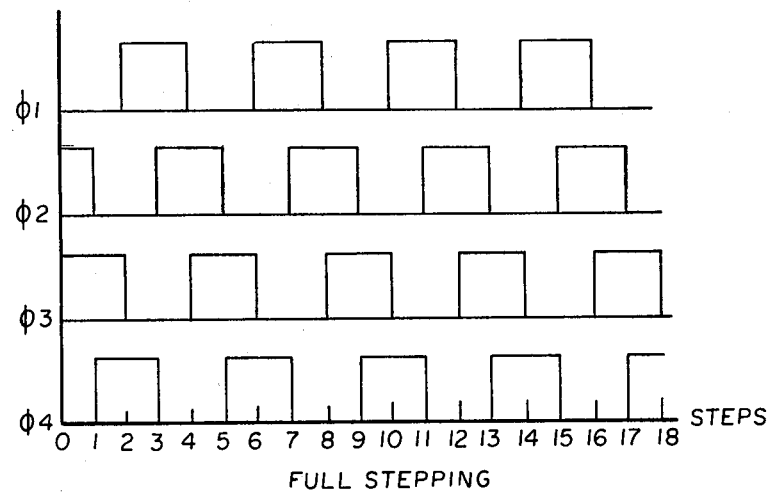
FIG. 2 is a graph showing motor current vs. number of steps for a classical full stepping of a four phase stepper motor with four phase switches 90° apart.

The operation of a stepper motor is known in the art. Micro-stepping is a method of achieving much smaller steps, or smaller angular displacements of the motor shaft than occurs during normal operation. The present invention contemplates a stepper motor with four windings. Referring to FIG. 2, the vertical axis represents motor current in each of the four windings and the horizontal axis represents time. A step of the motor occurs at each current pulse on any coil. The current waveforms are four symmetrical, unipolar square waves in a full quadrature relationship to one another. If the motor selected is a 1.8° motor, each step represents 1.8° of angular motion, giving 200 steps per motor revolution.

Figure 3:
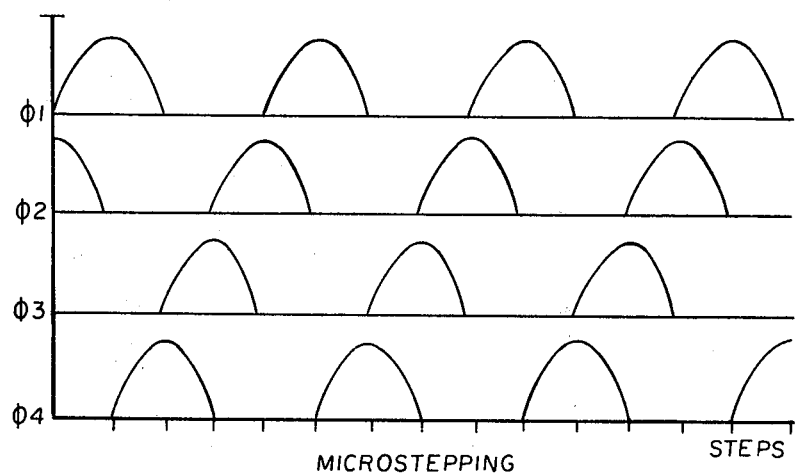
FIG. 3 is a graph showing motor current vs. number of steps in which the current waveforms are half-wave rectified with the quadrature relationship maintained.
Figure 4:
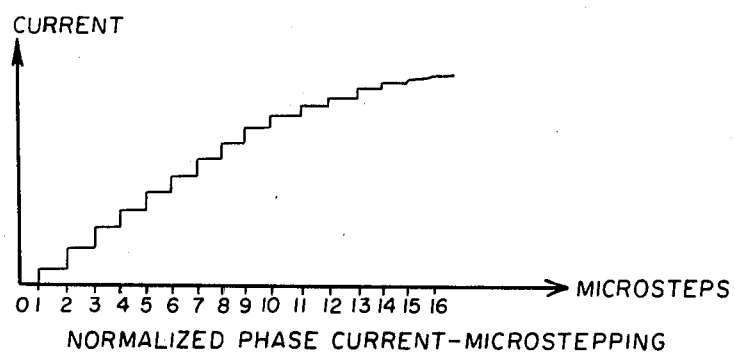
FIG. 4 is a graph showing motor current vs. number of micro-steps in which the normalized phase current yields incremental steps.

To achieve micro-stepping, each of the current waveforms is changed to half wave rectified sines while maintaining the quadrature relationship as is shown in FIG. 3. If the sines were truly continuous, no stepping of the motor would occur. The present invention generates sine waves digitally dividing the sine waves into small discrete steps. The motor will thus step, with the steps being much smaller than normal full steps. The micro-step will be equal to one full step divided by the number of increments in each quarter cycle of the sine wave with each of the micro-steps being of equal size. The drive circuit 16 also comprises a steering circuit, not shown, to direct which coil will be powered. The present invention contemplates dividing each quarter cycle into 16 increments, giving 16 equal micro-steps per normal full step or 3200 micro-steps per revolution. Each micro-step will then give a rotation of approximately 0.11° instead of the normal 1.8°. The waveform for motor current of the present invention can be seen in FIG. 4.

Another method for accomplishing micro-stepping is to drive the four poles of the stepper motor 18 through linear amplifiers with a quadrature sine wave.

Figure 5:
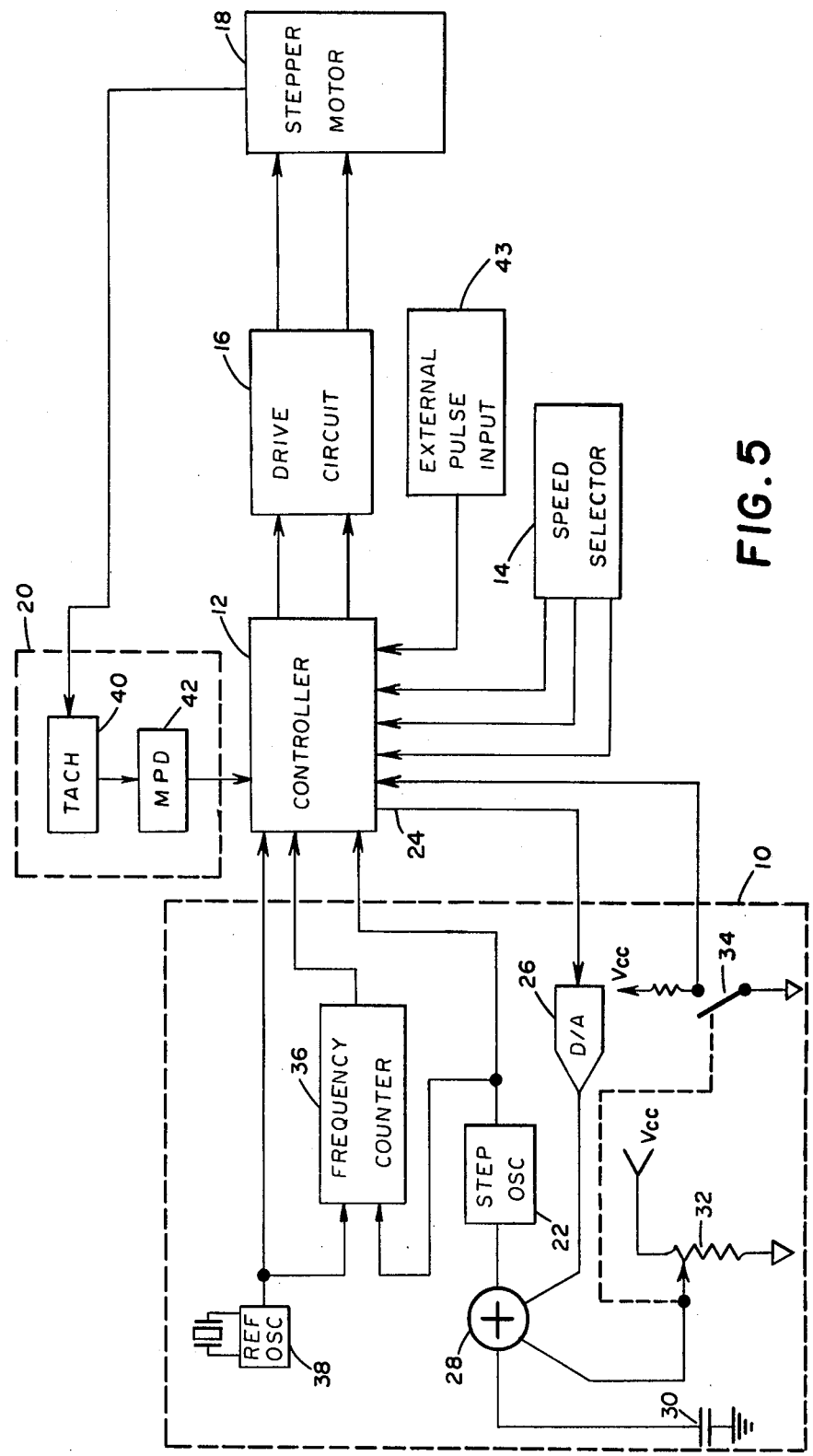
FIG. 5 is a detailed block diagram of the present invention.

Referring now to FIG. 5, a speed is selected from the speed selector 14. This can take the form of a switch or by a remote interface enable. The speed selector 14 is operatively connected to the controller 12 which receives a coded signal from the speed selector 14. The controller 12 then generates a numerical constant which is determined by the speed selected from the speed selector 14.

The step clock system 10 has a voltage controlled, step oscillator 22. The step oscillator 22 is operatively connected to the controller 12. The controller 12 has an output 24 which puts out a digital signal which is indicative of the frequency at which the step oscillator is to run. The output 24 is operatively connected to a digital to analog converter, hereinafter D to A converter, 26 within the step clock system 10. The output of the D to A converter 26 is operatively connected to a summing junction 28 and then to step oscillator 22. As will be appreciated by those skilled in the art, the output 24 of the controller 12 controls the frequency of step oscillator 22. This will be a fixed frequency which is determined at the time of calibration of the controller 12. The summing junction 28 also has a capacitor 30 that is used during motor start up. An instantaneous frequency cannot be placed on a stepping motor or else the motor will lock up. The frequency must be integrated up to the selected operating frequency. Since the step oscillator 22 is voltage controlled, the capacitor 30 will permit an integration of the output frequency to the desired value.

A variable adjustment is provided by a potentiometer network 32 and an integral switch 34. If potentiometer 32 is rotated in one direction, switch 34 opens instructing the controller 12 to suspend any attempt to adjust the step oscillator 22. This would permit continuously variable adjustment of the step oscillator frequency by potentometer 32.

The step oscillator output activates a decrement counter, not shown, within the controller 12. The numerical constant is decremented for at least one pulse of the step oscillator 22 and could occur on each transition if so desired. A comparator within the controller 12 determines when the numerical constant has been decremented down to zero. When the numerical constant reaches zero, an output signal causes the stepping motor to advance by one increment. Assuming the 1.8° motor discussed above with 16 increments per quarter cycle, each time the numerical constant within the controller decrements to zero, the motor is advanced approximately 0.11°.

As will be appreciated by those skilled in the art, it will be apparent that the speed is a direct function of the value of the numerical constant. The larger the numerical constant established in the controller 12 by the speed selector 14, the longer it takes to decrement the constant to zero and consequently the slower the motor motion. Inversely, the smaller the value of the numerical constant the faster the motor motion.

The present invention also contemplates that the numerical constant may not go to zero, but to some predetermined value. Also, an increment counter may be used in which case the numerical constant would increment to some predetermined number before update occurs. If an increment counter is used, the controller would establish an initial smaller number to generate slower speeds and vice-versa.

The step clock system 10 has a self correcting feature. The output of the step oscillator 22 is operatively connected to a frequency counter 36 which is in turn operatively connected to the controller 12. A crystal controlled reference oscillator 38 is also connected to the frequency counter 36 and is connected to the controller 12. The controller compares the value of the frequency counter against a reference each time the internal constant within the controller 12 decrements down. If the frequency is incorrect, the output 24 is adjusted appropriately to adjust the frequency. Such errors may occur due to temperature variations, etc. The reference oscillator 38 provides a time base for the frequency counter 36 and the controller 12.

The motion detector 20 comprises a tachometer 40 and a missing pulse detector 42 hereinafter MPD. The purpose of the motion detector 14 is to provide a failsafe system. If the motor is stopped externally by force, the MPD 42 interrupts the controller 12 and re-accelerates the motor.

Also provided is an external pulse input 43. At the direction of the speed selector 14, the controller may ignore the step clock oscillator and update the motor controller at each transition of the externally supplied oscillator. This effectively permits the motor motion to be controlled by external means.

Figure 6:
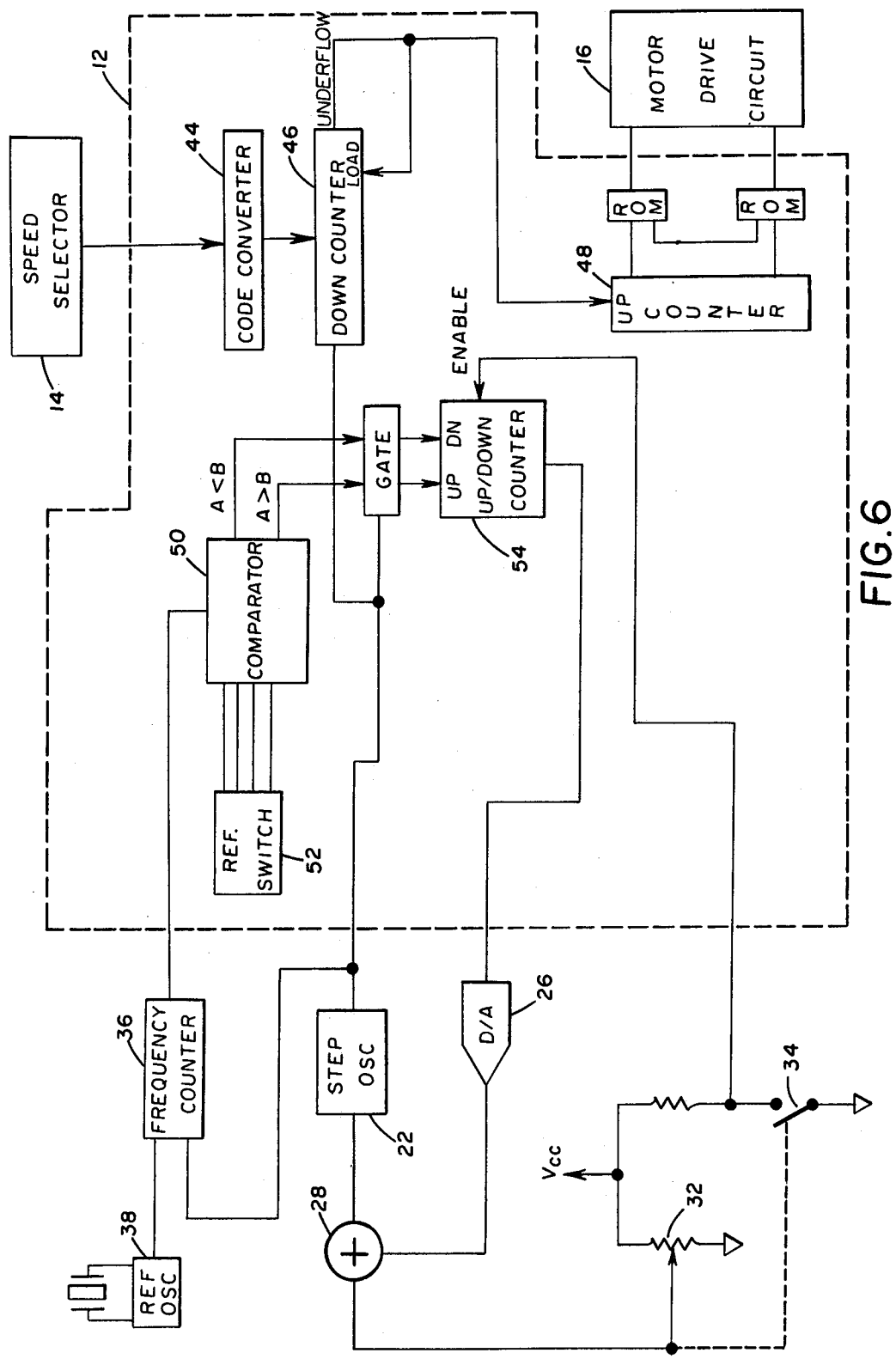
FIG. 6 is a detailed block diagram of the present invention using specific digital devices for the controller functions.

The present invention has been described in which the controller 12 is preferably a micro-processor that performs all the functions described supra internally. Those skilled in the art will appreciate that the same functions can be accomplished using specific digital devices instead of the microprocessor. Referring now to FIG. 6, the operation of the specific digital devices will be described with respect to a decrement counter. The speed selector 14 sends a code to the code converter 44 which generates a numerical constant as a function of the speed selected. The code converter 44 establishes this numerical constant in a down counter 46 which decrements the numeral down for each step of the step oscillator 22 until the counter reches zero. At this point, the underflow output of the counter causes the up counter 48 to increment and the down counter to reload the numerical constant. The motor drive circuit 16 is then updated so that the motor advances.

The step oscillator control function is accomplished by use of a comparator 50 which compares the output of the frequency counter 36 against a reference count established by reference switch 52. Depending on the result of the comparator, the counter 54 is either incremented, decremented or left alone. The change in output of the counter 54 will update the voltage output of the digital to analog converter 26 and thus vary the frequency output of step oscillator 22.

This invention has been described with reference to a preferred embodiment. Obvious modifications and alterations will occur to others upon reading and understanding of this specification. The intention is to include all such modifications and alterations insofar as they come within the scope of the appended claims or the equivalent thereof.

What is claimed is:

1. A micro-stepping control circuit for a stepper motor of the type used to drive the chart within an oscillographic recorder, said micro-stepping control circuit comprising:

a speed selector means for selecting the speed at which said stepper motor will drive said chart;

a step oscillator means for providing a step frequency pulse signal;

a controller means, said controller means being operatively connected to said speed selector means and said step oscillator means, said controller internally generating a numerical constant whose value is determined by the speed selector means, said numerical constant being either decremented or incremented by at least one pulse from said step oscillator means, said controller means determining if said numerical constant has reached to some predetermined value and then generating a signal indicative thereof; and drive means operatively connected to said controller means and said stepper motor for driving said stepper motor with a full wave rectified sine and cosine signal broken into staircase increments, said drive means being updated whenever said controller means determines that said numerical constant reaches said predetermined value wherein update for said drive means provides a incremental part of a full step of said stepper motor.

whereby said chart speed is determined by said numerical constant and the time it takes to reach said predetermined value.

2. The micro-stepping control circuit of claim 1 wherein said drive means further comprises a steering circuit to direct which coils of said stepper motor will be powered.

3. The micro-stepping control circuit of claim 1 wherein the drive means drives the four poles of said stepper motor through a linear amplifier with a quadrature sine wave broken into staircase increments.

4. The micro-stepping control unit of claim 1 further comprising a motion detector means having a tachometer and a missing pulse detector for determining when external force has stopped said chart and to re-accelerate said stepper motor if in continuous operation.

* * * * *

REEXAMINATION CERTIFICATE (356th)
United States Patent [19]
Daniel et al.

[11] B1 4,377,847
[45] Certificate Issued  May 28, 1985

[54] MICROPROCESSOR CONTROLLED MICRO-STEPPING CHART DRIVE

[75] Inventors: Richard A. Daniel, Lakewood; Ronald J. Geil, Vermilion, both of Ohio

[73] Assignee: Gould Inc., Rolling Meadows, Ill.

Reexamination Request:
No. 90/000,554, May 14, 1984

Reexamination Certificate for:
Patent No.: 4,377,847
Issued: Mar. 22, 1983
Appl. No.: 234,975
Filed: Feb. 17, 1981

[51] Int. Cl.³ .................. G06F 15/46; G05B 19/40
[52] U.S. Cl. .................................. 364/400; 318/685; 318/696; 364/130; 364/174
[58] Field of Search ............ 364/130, 167, 174, 183, 364/400; 318/685, 696, 138, 601, 603

[56] References Cited

U.S. PATENT DOCUMENTS

| | | | |
|---|---|---|---|
| 3,492,553 | 1/1970 | Gordon et al. | 318/138 |
| 3,579,279 | 5/1971 | Kawasaki-shi | 318/696 |
| 3,582,751 | 6/1971 | Rosshirt et al. | 318/696 |
| 3,648,144 | 3/1972 | Rosen | 318/696 |
| 3,777,246 | 12/1973 | Barnes | 318/696 |
| 3,818,261 | 6/1974 | Clark, Jr. | 318/696 |
| 3,878,445 | 4/1975 | Kirkham et al. | 318/308 |
| 3,885,210 | 5/1975 | Burnett | 318/696 |
| 3,899,729 | 8/1975 | Emery | 318/696 |
| 3,906,324 | 9/1975 | Smith | 318/567 |
| 3,908,195 | 9/1975 | Leenhouts | 318/696 |
| 3,909,693 | 9/1975 | Yoshitake et al. | 318/696 |
| 3,919,608 | 11/1975 | Usami et al. | 318/138 |
| 3,963,971 | 6/1976 | Leenhouts et al. | 318/696 |
| 3,971,972 | 7/1976 | Stich | 318/227 |
| 3,978,383 | 8/1976 | Carthy | 318/227 |
| 4,032,827 | 6/1977 | Dobratz et al. | 318/696 |
| 4,059,746 | 11/1977 | Haga | 364/107 |
| 4,075,544 | 2/1978 | Leenhouts | 318/696 |
| 4,087,732 | 5/1978 | Pritchard | 318/696 |
| 4,091,316 | 5/1978 | Friedman | 318/696 |
| 4,099,107 | 7/1978 | Eder | 318/227 |
| 4,107,594 | 8/1978 | Jacobs | 318/685 |
| 4,121,145 | 10/1978 | Talmadge | 318/696 |
| 4,126,821 | 11/1978 | Cannon | 318/696 |
| 4,140,956 | 2/1979 | Pritchard | 318/696 |
| 4,145,644 | 3/1979 | Liu | 318/696 |

OTHER PUBLICATIONS

Technical Bulletin No. 12, by Watanabe Instruments Corp., 1978—See particularly pp. 9 and 10 and FIG. 3, 1978.

Superior Electric Company—"Microstepping of Step Motors"—Copyrighted 1978.

*Primary Examiner*—Joseph F. Ruggiero

[57] ABSTRACT

A microprocessor controlled micro-stepping chart drive circuit is disclosed. The invention comprises a step clock system, a micro-processor controller and a motor drive circuit. A speed selector establishes a numerical constant within the controller. This numerical constant is decremented down with each pulse of the step clock. When the counter reaches zero, the motor drive circuit is updated. Therefore, the time between updates of the motor drive circuit is a function of the value of the numerical constant.

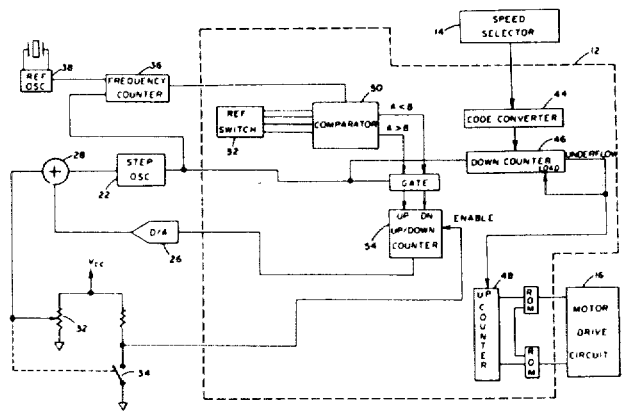

REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-4 are cancelled.

* * * * *